United States Patent
Romano et al.

(10) Patent No.: US 6,591,209 B1
(45) Date of Patent: Jul. 8, 2003

(54) AUTOMATIC CALIBRATION OF SPEED SIGNAL SCALING

(75) Inventors: Paschal J. Romano, Fenton, MI (US); Daniel A. Crawford, Burton, MI (US); Diana K. Voges, Fenton, MI (US)

(73) Assignee: Delphi Technologies, Inc., Troy, MI (US)

(*) Notice: Subject to any disclaimer, the term of this patent is extended or adjusted under 35 U.S.C. 154(b) by 148 days.

(21) Appl. No.: 09/739,728

(22) Filed: Dec. 18, 2000

(51) Int. Cl.$^7$ .............................................. G01C 17/38
(52) U.S. Cl. ......................... 702/96; 702/142; 702/149
(58) Field of Search ............................. 702/85, 95, 96, 702/142, 145–149; 701/93, 94, 95; 180/170, 177, 178

(56) References Cited

U.S. PATENT DOCUMENTS

| | | | |
|---|---|---|---|
| 5,220,509 A | * 6/1993 | Takemura et al. | 701/216 |
| 5,680,024 A | * 10/1997 | Ehle et al. | 180/178 |
| 5,828,585 A | * 10/1998 | Welk et al. | 702/96 |
| 6,363,310 B1 | * 3/2002 | Schuplin et al. | 701/93 |

* cited by examiner

Primary Examiner—Bryan Bui
(74) Attorney, Agent, or Firm—Vincent A. Cichosz

(57) ABSTRACT

A method for automatically calibrating a vehicle speed sensor signal input to an electronic control system includes operating a vehicle at a reference speed. A speed signal pulse period, generated by a vehicle speed sensor operatively coupled to the vehicle, is measured. The measured speed signal pulse period is then compared to a stored set of pulse period scalings within the electronic control system. A corresponding pulse period scaling is stored in memory if the measured speed signal pulse period matches one of the stored set of pulse period scalings.

20 Claims, 2 Drawing Sheets

AUTOMATIC CALIBRATION OF SPEED SIGNAL SCALING

TECHNICAL FIELD

The present invention relates generally to speed signal calibration. More particularly, the present invention relates to a method of automatic calibration of speed signal scaling for vehicle electronic systems, such as a cruise control system.

BACKGROUND OF THE INVENTION

Cruise control systems, among other vehicle systems, process information regarding the speed of a vehicle. In order to measure and determine speed, a vehicle is typically equipped with a vehicle speed sensor operatively coupled to the vehicle's transmission to monitor the rotational speed of a shaft in the transmission. The speed sensor may include a Hall-effect or variable-reluctance sensor, and generates a vehicle speed sensor (VSS) signal that must be accurately determinable.

The VSS signal comprises a series of pulses which, when used in conjunction with a particular vehicle, has a characteristic "pulses-per-mile" (ppm) ratio or other comparable ratio. However, these pulse ratios typically vary among automotive systems. Thus, an automotive system using a VSS signal as an input, such as a cruise control module, must be calibrated to the particular vehicle in which it is installed.

In the past, manufacturers of electronic control modules have provided multiple module part numbers to accommodate the various and unique hardware/software calibrations that correspond to a particular ppm ratio of a given speed sensor. These calibrations are typically established at the point of module manufacture. Alternatively, a single module part number may be provided, but this generally results in the calibrations being performed by the purchaser (usually the vehicle manufacturer) of the modules. In this situation, the vehicle manufacturer may end up purchasing and operating expensive, specialized "end of line" or field service programming equipment.

It is therefore desirable to provide a calibration method which addresses the aforementioned concerns.

SUMMARY OF THE INVENTION

The above discussed and other drawbacks and deficiencies are overcome or alleviated by a method for automatically calibrating speed signal scaling for vehicle electronic systems. In an exemplary embodiment of the invention, a method for automatically calibrating a vehicle speed sensor signal input to an electronic control system includes operating a vehicle at a reference speed. A speed signal pulse period, generated by a vehicle speed sensor operatively coupled to the vehicle, is measured. The measured speed signal pulse period is then compared to a stored set of pulse period scalings within the electronic control system. A corresponding pulse period scaling is stored in memory if the measured speed signal pulse period matches one of the stored set of pulse period scalings.

In a preferred embodiment, a system operation flag is set to a first state if the measured speed signal pulse period matches one of the stored set of pulse period scalings. Alternatively, the system operation flag is set to a second state if the measured speed signal pulse period does not match at least one of the stored set of pulse period scalings.

The electronic control system is rendered operational if the system operation flag is set to the first state and rendered non-operational if the system operation flag is set to the second state.

BRIEF DESCRIPTION OF THE DRAWINGS

The present invention will now be described, by way of example only, with reference to the accompanying drawings which are meant to be exemplary, not limiting, and wherein like elements are numbered alike in several Figures, in which.

DESCRIPTION OF THE PREFERRED EMBODIMENT

Figure 1:
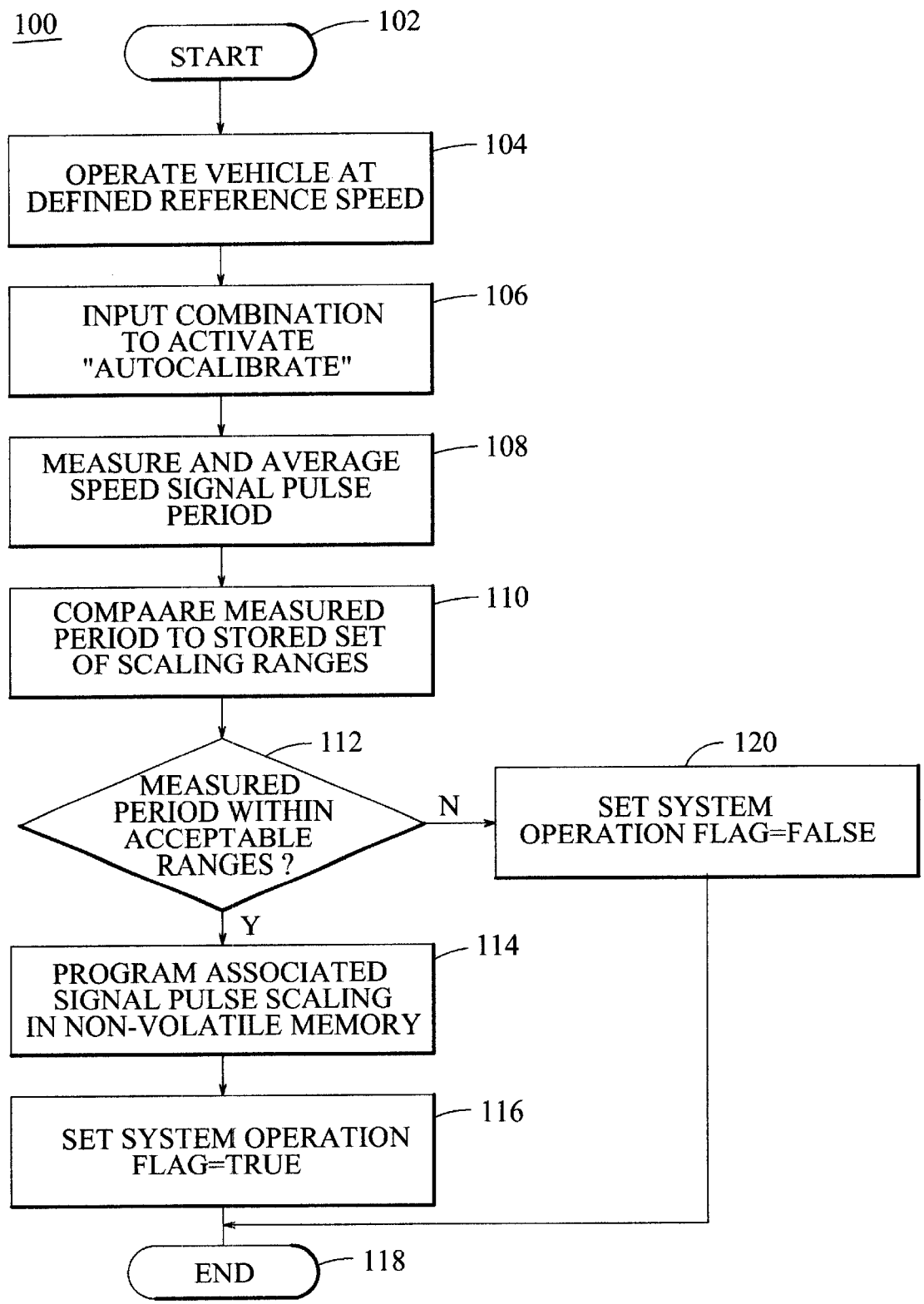
FIG. 1 is a flow diagram illustrating a method for automatically calibrating a vehicle speed sensor signal input to an electronic control system, in accordance with an embodiment of the invention.

Referring initially to FIG. 1, a method 100 illustrates the calibration criteria to be satisfied before normal system operation is allowed for a given module (not shown) of an electronic control system (not shown). Method 100 begins with a start block 102 and proceeds to block 104 where a vehicle (in which module is to be installed) is operated at a defined reference speed. Proceeding to block 106, a combination, code or other similar feature is inputted to activate the autocalibration feature of the module. Next, block 108 measures the speed signal pulses generated by the vehicle's speed sensor, averages the measured values for a defined interval, and determines an average signal pulse period. Block 110 then compares the measured signal pulse period to a predefined set of acceptable ranges corresponding to a finite set of possible pulses-per-mile scalings stored in the module. At decision block 112, if the measured pulse period falls within the acceptable ranges of any of the stored pulses-per-mile scalings, then method 100 proceeds to block 114, where the pulses-per-mile scaling corresponding to the measured period is programmed into non-volatile memory. A system operation flag is then set to a first state "true" at block 116 and the calibration process is completed at end block 118. In order for system operation to be enabled, the system operation flag must be set to "true". On the other hand, if at decision block 112 it is determined that the measured pulse period does not fall within the acceptable ranges of any of the stored pulses-per-mile scalings, then method 100 proceeds to block 120 where the system operation flag is set to a second state "false". Method 100 then proceeds to end block 118 without calibration taking place. In this situation, the module is not successfully calibrated since it did not recognize the measured speed signal pulse period from the vehicle speed sensor. Accordingly, the module will not operate if installed in that particular test vehicle.

Figure 2:
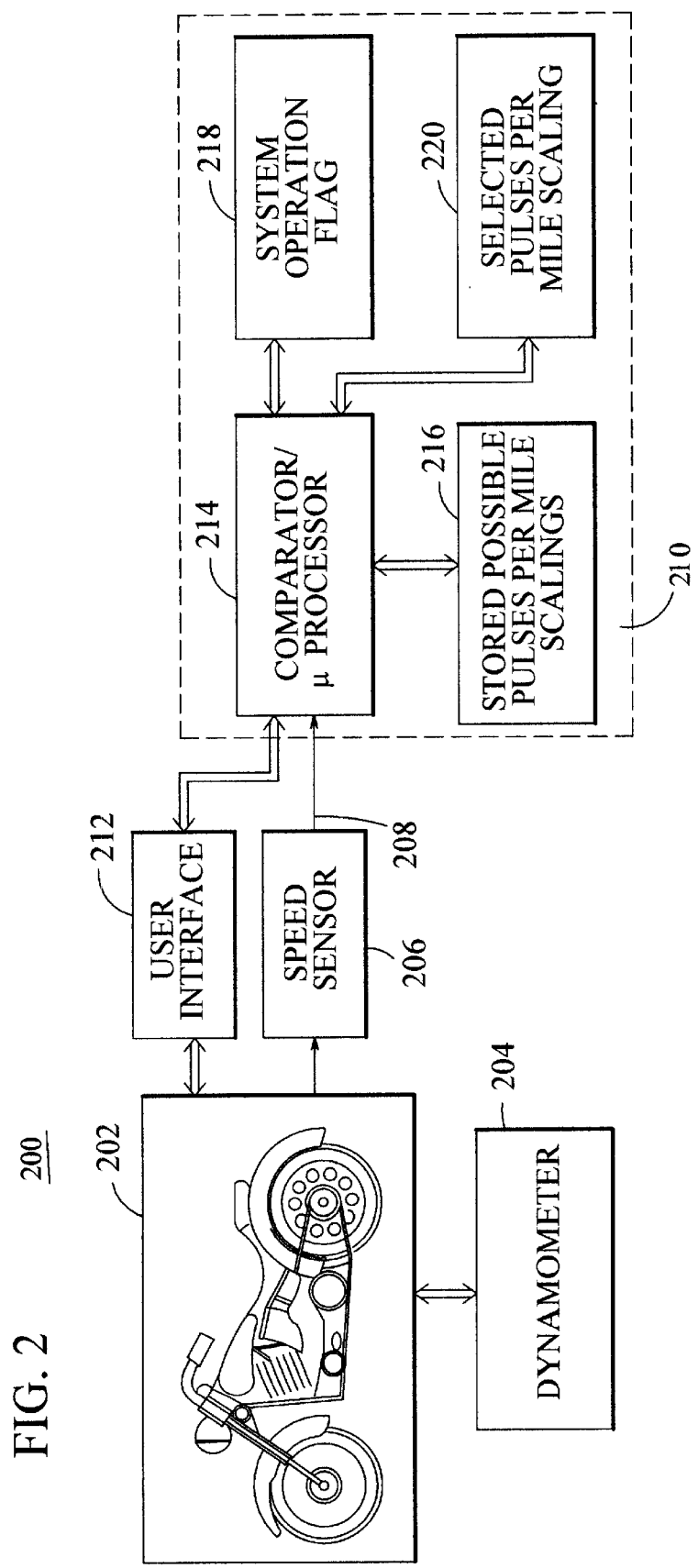
FIG. 2 is a block diagram which details an example of a system employing the method illustrated in FIG. 1.

Referring now to FIG. 2, there is shown an example of a system 200, which employs the method 100 illustrated in FIG. 1. A motor vehicle 202 is operated at a defined reference speed on dynamometer 204. Speed sensor 206, which is operatively coupled to vehicle 202, provides a pulse signal 208. Signal 208 is connected to an electronic control module (ECM) 210 to be calibrated. A user interface 212 allows a manual input of a code, combination, switching device or other means to begin the calibration process. Once the calibration process is commenced, a comparator/microprocessor 214 receives the signal 208 and computes a signal pulse period for speed sensor 206.

Since signal 208 contains a series of pulses, the comparator/microprocessor/ 214 measures the time interval between consecutive pulses, thereby determining a speed pulse period.

In a preferred embodiment, a series of speed pulse periods are determined and averaged together for a defined interval to allow for reference speed stabilization. Once an average speed pulse period is determined for speed sensor 206, comparator/microprocessor 214 then compares that value to acceptable ranges corresponding to a discrete set of stored possible pulses-per mile scalings. These scalings are stored in memory block 216, and are accessible by comparator/ microprocessor 214. Depending upon the outcome of the comparison (as illustrated by decision block 112 in FIG. 1), a system operation flag 218 is set. If flag 218 is set to "true", module 210 is enabled for operation with vehicle 202. If flag 218 is set to "false", module 210 is disabled and the calibration procedure is ended. Finally, a block 220 represents the recorded selected pulses-per-mile scaling if the speed sensor 206 generates a recognized pulses-per-mile period. Preferably, both the system operation flag 218 and the selected pulses-per-mile scaling in block 220 are stored in non-volatile memory.

By way of illustrative example only, it will be assumed that ECM 210 comprises a cruise control unit module intended for installation in vehicle 202. Before the module 210 is enabled for operation, the signal 208 of speed sensor 206 of vehicle 202 must be checked and its speed pulse period determined to see whether it is compatible with the predefined scaling ranges stored within the module 210. It is further assumed that the speed sensor 206 generates signal 208 having an average interval of 50 milliseconds between consecutive pulses when vehicle 212 is operated at a speed of 36 m.p.h. This, in turn, translates into a signal scaling of 2,000 pulses-per-mile. This value is then compared with a set of stored ranges in memory block 216. If one of the aforesaid stored ranges includes, for example, a pulses-per-mile scaling range of 1,900 to 2,100, then module 210 will be automatically calibrated to 2,000 pulses-per-mile, which is stored in NVM 220. Further, flag 218 will then be set to "true", thereby allowing module 210 to be operated in conjunction with vehicle 202. However, if none of the programmed range of scaling values stored in block 216 includes 2,000 pulses-per-mile, then no calibration takes place and flag 218 is set to "false". In this instance, module 210 will not operate in conjunction with vehicle 202.

Although a cruise control module is described in the exemplary embodiment, it will be appreciated that the aforementioned methodology is equally applicable to any system in which speed information is inputted. Other systems to which the present embodiments of the invention are applicable include, but are not limited to, electric power steering systems, steer by wire systems, antilock braking systems, global positioning systems, and the like.

The methodology described hereinbefore allows a system module having a speed signal to be automatically calibrated such that the same module part may be employed in multiple vehicle models without requiring the purchaser to perform end-of-line or field service calibration. Accordingly, a cost savings benefit is realized. Naturally, the greater the number of acceptable ranges for pulses-per-mile scalings programmed into the system module, the greater the flexibility the module may have in terms of its operational installation into several different vehicle models.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for automatically calibrating a vehicle speed sensor signal input to an electronic control system, comprising:

operating a vehicle at a reference speed;

measuring a speed signal pulse period generated by a vehicle speed sensor, said vehicle speed sensor operatively coupled to said vehicle;

comparing said measured speed signal pulse period to a stored set of pulse period scalings within the electronic control system;

storing a corresponding pulse period scaling in memory if said measured speed signal pulse period matches one of said stored set of pulse period scalings.

2. The method of claim 1, further comprising:

setting a system operation flag to a first state if said measured speed signal pulse period matches one of said stored set of pulse period scalings; and setting said system operation flag to a second state if said measured speed signal pulse period does not match at least one of said stored set of pulse period scalings;

wherein the electronic control system is rendered operational if said system operation flag is set to said first state and the electronic control system is rendered non-operational if said system operation flag is set to said second state.

3. The method of claim 1, further comprising determining an average speed signal pulse period generated by said vehicle speed sensor.

4. The method of claim 1, further comprising inputting an activation code into the electronic control system, said activation code enabling a calibrating feature of the electronic control system.

5. The method of claim 1, further comprising storing said corresponding pulse period scaling in non-volatile memory if said measured speed signal pulse period matches one of said stored set of pulse period scalings.

6. A storage medium encoded with a machine readable computer program code for automatically calibrating a vehicle speed sensor signal input to an electronic control system, the storage medium including instructions for causing a computer to implement a method, the method comprising:

operating a vehicle at a reference speed;

measuring a speed signal pulse period generated by a vehicle speed sensor, said vehicle speed sensor operatively coupled to said vehicle;

comparing said measured speed signal pulse period to a stored set of pulse period scalings within the electronic control system;

storing a corresponding pulse period scaling in memory if said measured speed signal pulse period matches one of said stored set of pulse period scalings.

7. The storage medium of claim 6, wherein said method further comprises:

setting a system operation flag to a first state if said measured speed signal pulse period matches one of said stored set of pulse period scalings; and setting said system operation flag to a second state if said measured speed signal pulse period does not match at least one of said stored set of pulse period scalings;

wherein the electronic control system is rendered operational if said system operation flag is set to said first state and the electronic control system is rendered non-operational if said system operation flag is set to said second state.

8. The storage medium of claim 6, wherein said method further comprises determining an average speed signal pulse period generated by said vehicle speed sensor.

9. The storage medium of claim 6, wherein said method further comprises inputting an activation code into the electronic control system, said activation code enabling a calibrating feature of the electronic control system.

10. The storage medium of claim 6, wherein said method further comprises storing said corresponding pulse period scaling in non-volatile memory if said measured speed signal pulse period matches one of said stored set of pulse period scalings.

11. A computer data signal for automatically calibrating a vehicle speed sensor signal input to an electronic control system, the computer data signal comprising code configured to cause a processor to implement a method, the method comprising:

operating a vehicle at a reference speed;

measuring a speed signal pulse period generated by a vehicle speed sensor, said vehicle speed sensor operatively coupled to said vehicle;

comparing said measured speed signal pulse period to a stored set of pulse period scalings within the electronic control system;

storing a corresponding pulse period scaling in memory if said measured speed signal pulse period matches one of said stored set of pulse period scalings.

12. The computer data signal of claim 11, wherein said method further comprises:

setting a system operation flag to a first state if said measured speed signal pulse period matches one of said stored set of pulse period scalings; and setting said system operation flag to a second state if said measured speed signal pulse period does not match at least one of said stored set of pulse period scalings;

wherein the electronic control system is rendered operational if said system operation flag is set to said first state and the electronic control system is rendered non-operational if said system operation flag is set to said second state.

13. The computer data signal of claim 11, wherein said method further comprises determining an average speed signal pulse period generated by said vehicle speed sensor.

14. The computer data signal of claim 11, wherein said method further comprises inputting an activation code into the electronic control system, said activation code enabling a calibrating feature of the electronic control system.

15. The computer data signal of claim 11, wherein said method further comprises storing said corresponding pulse period scaling in non-volatile memory if said measured speed signal pulse period matches one of said stored set of pulse period scalings.

16. A calibration system for automatically calibrating a vehicle speed sensor signal input to an electronic control system, the calibration system comprising:

a vehicle operated at a reference speed;

a vehicle speed sensor, operatively coupled to said vehicle, said vehicle speed sensor generating a vehicle speed signal;

a microprocessor within the electronic control system, said microprocessor receiving said vehicle speed signal, said microprocessor further measuring a speed signal pulse period;

a stored set of pulse period scalings within the electronic control system;

wherein said microprocessor compares said speed signal pulse period to said stored set of pulse period scalings, said microprocessor further storing a corresponding pulse period scaling in memory if said measured speed signal pulse period matches one of said stored set of pulse period scalings.

17. The calibration system of claim 16, further comprising a system operation flag in communication with said microprocessor, said system operation flag being set to a first state if said measured speed signal pulse period matches one of said stored set of pulse period scalings; and said system operation flag being set to a second state if said measured speed signal pulse period does not match at least one of said stored set of pulse period scalings;

wherein the electronic control system is rendered operational if said system operation flag is set to said first state and the electronic control system is rendered non-operational if said system operation flag is set to said second state.

18. The calibration system of claim 16, wherein said microprocessor determinines an average speed signal pulse period generated by said vehicle speed sensor.

19. The calibration system of claim 16, wherein the electronic control module further comprises a user interface, said user interface capable of inputting an activation code into the electronic control system, said activation code thereby enabling a calibrating feature of the electronic control system.

20. The calibration system of claim 16, wherein said memory further comprises a non-volatile memory.

* * * * *